UNITED STATES PATENT OFFICE.

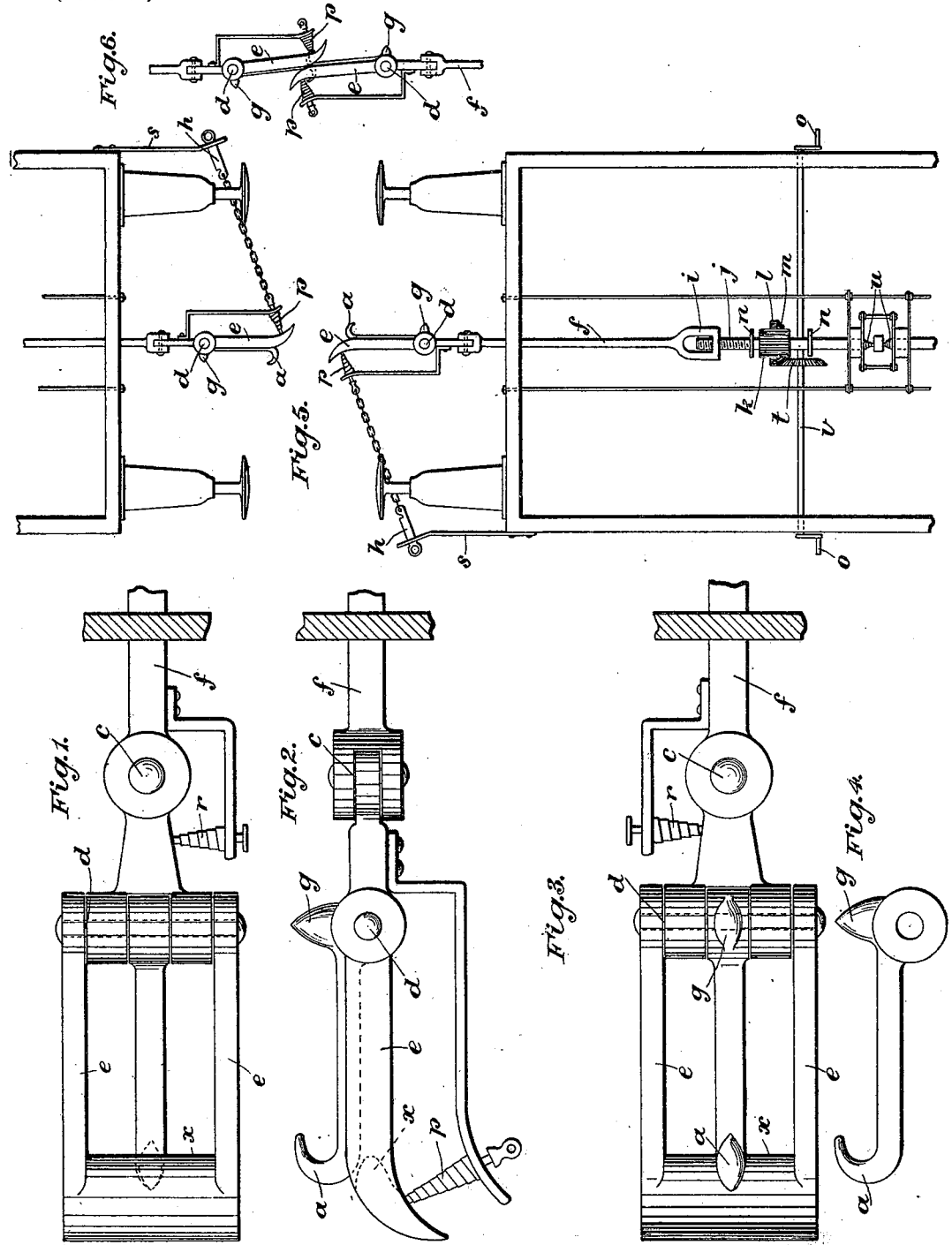

ANTON PISKUR, OF REMETINCEZ, AUSTRIA-HUNGARY.

COUPLING FOR RAILWAY-VEHICLES.

SPECIFICATION forming part of Letters Patent No. 652,921, dated July 3, 1900.

Application filed December 2, 1899. Serial No. 739,226. (No model.)

*To all whom it may concern:*

Be it known that I, ANTON PISKUR, a subject of the Emperor of Austria-Hungary, residing at Remetincez, near Agram, in the Empire of Austria-Hungary, have invented certain new and useful Improvements in Couplings for Railway-Vehicles, (for which I have made application for patent in Hungary on May 17, 1899;) and I do hereby declare the following to be a full, clear, and exact description of the invention, such as will enable others skilled in the art to which it appertains to make and use the same.

The object of this invention is to provide a railway-vehicle coupling in which the coupling of the vehicles is effected automatically and the uncoupling without any danger from the side. The simple and suitable construction of this coupling enables it to be manufactured cheaply and the former systems to be adapted to it with relatively little expense.

The invention hereinafter described is illustrated in the accompanying drawings.

Figure 1 is a view of one side of the coupling, some of the parts being supposed removed. Fig. 2 is a plan of the coupling. Fig. 3 is a similar view to Fig. 1 of the opposite side of the coupling. Fig. 4 is a side view of the coupling-hook. Fig. 5 is a plan of two carriages furnished with the coupling as well as of the apparatus beneath them for effecting the engagement of the coupling. Fig. 6 is a plan of the coupling when connected up.

The automatic coupling is effected in the following manner: When the carriages come into contact with one another, the links $e$ slide one on the other with their curved and inner convex surfaces turning slightly around the axis $d$. In this way the coupling-hooks $a$, furnished with canted ends, are guided one against the other and in such a manner that they at first slide one on the other, slightly turning about their axes $c$. As the carriages are brought nearer together, the hooks slide further on the inner curved surfaces $x$ of the links $e$ until they are opposite the openings in the links, when they are forced into engagement therewith by the spring $p$. The links $e$ can thereupon move around the shaft $d$ in a horizontal, and around the shaft $c$ in a vertical, plane, the springs $p$ and $r$ having a tendency to bring the coupling parts back again into their original position. The couplings after automatically engaging are secured in the following manner: A bevel-wheel $t$, keyed to a crank-shaft $v$, mounted under the vehicle, engages with a bevel-wheel $m$, fast with a spur-wheel $l$, engaging in a long pinion $k$. The screw $j$, on which the long pinion is fixed, engages in a stirrup $i$, formed on the draw-rod $f$, so that in rotating the crank $o$ the draw-rod $f$ is operated, through the gearing, to draw the coupling-hooks tightly against their links or slacken them to facilitate uncoupling. For the purpose of uncoupling, the hooks are first slackened, as described, and then pulled out of engagement with their links from the side of the vehicle by handles $h$, sliding in supports $s$, fixed to the frame of the vehicle and connected by a chain with the links $e$. The handle $h$ is pulled out to disconnect the link from the hook and secured in the disconnected position by turning handle $h$ until the support $s$ takes into the notch $y$. When the handle $h$ is released, the automatic coupling is effected upon the carriages coming into contact with one another, as already described. The purpose of the projection $g$ on the hook $a$ is to take up a part of the shock from the end of the link $e$ when the carriages come into violent contact with one another. The object of the springs $u$ is to weaken the effect of the concussion on the coupling parts when the carriages come into contact. The shaft of the wheels $l$ and $m$ is seated in the plates $n$.

What I claim, and desire to secure by Letters Patent, is—

1. A railway-vehicle coupling comprising coupling-links provided with bevel or curved surfaces to guide the coupling-hooks, coupling-hooks adapted to slide one on the other after the ends come into contact and engage the links, brackets hinged at their rear ends by horizontal hinges to a draw-piece and hinged at their forward ends by vertical hinges to the coupling links and hooks, a spring for keeping the bracket in position, a spring supported on the bracket for keeping the link in position, a draw-bar, and adjustable mechanism between the draw bar and piece adapted to be operated from the side to vary the distance between the draw-bar and draw-piece.

2. A railway-vehicle coupling comprising coupling-links provided with bevel or curved surfaces to guide the coupling-hooks, coupling-hooks adapted to slide one on the other after the ends come into contact and engage the links, brackets hinged at their rear ends by horizontal hinges to a draw-piece and hinged at their forward ends by vertical hinges to the coupling links and hooks, a spring for keeping the bracket in position, a spring supported on the bracket for keeping the link in position, a draw-bar, adjustable mechanism between the draw bar and piece adapted to be operated from the side to vary the distance between the draw-bar and draw-piece, and a chain attached to the link and extending to the side of the vehicle.

In testimony whereof I have affixed my signature in presence of two witnesses.

ANTON PISKUR.

Witnesses:
　EMGELMANN REWOLT,
　COLLNAUER FENÖH.